(12) United States Patent
Stephan

(10) Patent No.: US 6,892,357 B2
(45) Date of Patent: May 10, 2005

(54) LOGISTICS MANAGEMENT METHOD AND SYSTEM

(75) Inventor: Frank Stephan, Luedenscheid (DE)

(73) Assignee: SAP Aktiengesellschaft, Walldorf (DE)

(*) Notice: Subject to any disclaimer, the term of this patent is extended or adjusted under 35 U.S.C. 154(b) by 0 days.

(21) Appl. No.: 10/712,532

(22) Filed: Nov. 14, 2003

(65) Prior Publication Data

US 2005/0015314 A1 Jan. 20, 2005

Related U.S. Application Data

(60) Provisional application No. 60/486,434, filed on Jul. 14, 2003.

(51) Int. Cl.[7] ............................................. G06F 13/00
(52) U.S. Cl. ...................................... 715/765; 345/826
(58) Field of Search ............................... 715/763, 764, 715/826, 765

(56) References Cited

U.S. PATENT DOCUMENTS 6,005,571 A * 12/1999 Pachauri ..................... 715/764
6,104,391 A * 8/2000 Johnston et al. ............ 715/745

* cited by examiner

Primary Examiner—Cao Nguyen
(74) Attorney, Agent, or Firm—Kenyon & Kenyon

(57) ABSTRACT

In a system and method for logistics management according to embodiments of the present invention, a user interface may present a user with input fields that correlate naturally with typical logistics processes. More specifically, the user interface may comprise: a step field to receive a value relating to a current step in a logistics process, and data associated therewith; a predecessor step field to receive a value relating to a step in the logistics process previous to the current step, and data associated therewith; and a mode field to receive a value relating to an action to be performed based on values received in the step and predecessor step fields. The values acceptable by the fields may be terms that are descriptive of typical activities in a particular user's business, so that using the interface has a natural or intuitive feel for the user.

26 Claims, 10 Drawing Sheets

| FIELD | TYPE | MEANING |
| --- | --- | --- |
| MANDT | KEY FIELD | CUSTOMER |
| TEW_TYPE | KEY FIELD | TEW TYPE |
| SCENARIO | KEY FIELD | BUSINESS SCENARIO |
| STEP | KEY FIELD | STEP OF THE BUSINESS PROCESS |
| TEW_MODE | KEY FIELD | OPERATION TO BE PERFORMED |
| PRE_STEP | KEY FIELD | PREDECESSOR STEP |
| CL_ACTION | ATTRIBUTE | NAME OF THE ACTION CLASS |

300

| FIELD | TYPE | MEANING |
| --- | --- | --- |
| MANDT | KEY FIELD | CUSTOMER |
| TEW_TYPE | KEY FIELD | TEW TYPE |
| STEP | KEY FIELD | STEP OF THE BUSINESS PROCESS |
| EXECUTION_TIME | KEY FIELD | EXECUTION TIME |
| ENH_ORDER | KEY FIELD | ORDER OF USE OF THE ENHANCEMENT CLASSES |
| CL_ENHANCE | ATTRIBUTE | CLASS FOR ENHANCEMENT OPERATIONS |

301

| FIELD | TYPE | MEANING |
| --- | --- | --- |
| MANDT | KEY FIELD | CUSTOMER |
| TEW_TYPE | KEY FIELD | TEW TYPE |
| SCENARIO | KEY FIELD | BUSINESS SCENARIO |
| STEP | KEY FIELD | STEP OF THE BUSINESS PROCESS |
| TEW_MODE | KEY FIELD | OPERATION TO BE PERFORMED |
| PRE_STEP | KEY FIELD | PREDECESSOR STEP |
| EXECUTION_TIME | KEY FIELD | EXECUTION TIME |
| ENH_ORDER | KEY FIELD | ORDER OF USE OF THE ENHANCEMENT CLASSES |
| CL_ENHANCE | ATTRIBUTE | CLASS FOR ENHANCEMENT OPERATIONS |

| FIELD | TYPE | MEANING |
|---|---|---|
| MANDT | KEY FIELD | CUSTOMER |
| TEW_TYPE | KEY FIELD | TEW TYPE |
| STEP | KEY FIELD | STEP OF THE BUSINESS PROCESS |
| EXECUTION_TIME | KEY FIELD | EXECUTION TIME |
| ENH_ORDER | KEY FIELD | ORDER OF USE OF THE ENHANCEMENT CLASSES |
| CL_FILTER | ATTRIBUTE | CLASS FOR FILTER OPERATION |

303

| FIELD | TYPE | MEANING |
|---|---|---|
| MANDT | KEY FIELD | CUSTOMER |
| TEW_TYPE | KEY FIELD | TEW TYPE |
| SCENARIO | KEY FIELD | BUSINESS SCENARIO |
| STEP | KEY FIELD | STEP OF THE BUSINESS PROCESS |
| TEW_MODE | KEY FIELD | OPERATION TO BE PERFORMED |
| PRE_STEP | KEY FIELD | PREDECESSOR STEP |
| EXECUTION_TIME | KEY FIELD | EXECUTION TIME |
| ENH_ORDER | KEY FIELD | ORDER OF USE OF THE ENHANCEMENT CLASSES |
| CL_FILTER | ATTRIBUTE | CLASS FOR FILTER OPERATION |

LOGISTICS MANAGEMENT METHOD AND SYSTEM

CROSS-REFERENCE TO RELATED APPLICATIONS

This application claims the benefit of U.S. provisional application Ser. No. 60/486,434, filed Jul. 14, 2003.

FIELD OF THE INVENTION

Embodiments of the present invention relate to improvements in logistics software.

BACKGROUND INFORMATION

Business operations typically involve such activities as the purchasing and sale of goods, storing and shipping of the goods, billing for the goods, and related activities. Activities of this kind, and planning and organization related to the activities may be referred to as "business logistics" or simply "logistics." Software used in facilitating logistics operations may accordingly be referred as "logistics software."

A disadvantage of known logistics software is that it may be too compartmentalized. That is, each step in a logistical process may have its own specialized associated software. A simple example of steps of a logistical process are the steps of receiving a customer order, scheduling delivery of the order, and updating inventory. Each of these steps might be performed by a different person, using different logistics software, in a different location. More specifically, suppose a customer contacts a seller of goods and places an order to purchase a quantity of goods. To meet the customer's order, the seller or his employee might typically start by using a logistics program, for example in a front office, to electronically generate a document known as a "sales order," recording such things as the customer's name, and the type and number of goods ordered. This might be followed by electronically generating, using a different logistics program, another document known as a "delivery order." The delivery order might, for example, be generated by a shipping clerk, and might include such information as a delivery location and time, a shipper, and so on. Then, when the goods are finally shipped, still another document, known as a "goods issue," could be generated by a person in a warehouse, using still another different logistics program. The goods issue might record, for example, how many items were shipped and when so that the seller's inventory records could be suitably updated.

Generating the necessary documentation at each step of the above example (receive customer order, schedule delivery, update inventory) may require detailed knowledge of the associated program on the part of at least three different actors. That is, each person generating a document must know what values are acceptable to the program, what functions to invoke in what order, and so on. Moreover, the foregoing is a very simple example, involving only three phases or steps in a logistical process; many other kinds of logistical operations are possible. For example, the customer may generate a parallel set of documents to record ordering the goods, receiving the goods, and to update its inventory. Many, more complex variations and more extended sequences of steps are possible. Accordingly, generating, tracking and managing the various documents associated with a logistical process can present serious challenges.

A further consideration is that there exist business persons or entities known as "traders" or "trading companies." The primary activity of a trader or trading company is to provide logistical services to buyers and sellers of various commodities, as opposed to manufacturing, or in some other fashion (e.g., harvesting some natural resource) directly providing a commodity. An example is a trader in oil. An oil trader or trading company might have to control all the steps on both the supply and demand sides of a logistical process. For example, in response to a request from a customer for a quantity of oil, the trader or trading company might have to find a seller, place a purchase order, receive shipment of the oil, update inventory to reflect the receipt, generate a sales order, schedule delivery, and update inventory to reflect the delivery. It may be appreciated in view of the earlier discussion that acquiring and maintaining the necessary expertise in all the different software that could be associated with each of these steps, and tracking and managing the corresponding documents, could be a formidable task for the trader or trading company.

In view of the foregoing considerations, improvements in logistics software are needed to simplify its use.

SUMMARY OF THE INVENTION

Embodiments of the present invention relate to a user interface for logistics management software that unifies many logistical operations within a simple framework that is easy to use and understand because of its natural and intuitive feel. According to the embodiments, the user interface may present a user with input fields that correlate naturally with typical logistics processes. More specifically, the user interface may comprise: a step field to receive a value relating to a current step in a logistics process, and data associated therewith; a predecessor step field to receive a value relating to a step in the logistics process previous to the current step, and data associated therewith; and a mode field to receive a value relating to an action to be performed based on values received in the step and predecessor step fields. The values acceptable by the fields may be terms that are descriptive of typical activities in a particular user's business, so that using the interface has a natural or intuitive feel for the user.

Embodiments of the invention may further comprise a customizing layer of software designed to accept and recognize such individualized terminology, and to map the terminology to functionality in a functional layer of software needed to carry out the actual operations to implement a corresponding process.

BRIEF DESCRIPTION OF THE DRAWINGS

FIG. 3 shows examples of customizing tables according to embodiments of the present invention;

DETAILED DESCRIPTION

Figure 1:
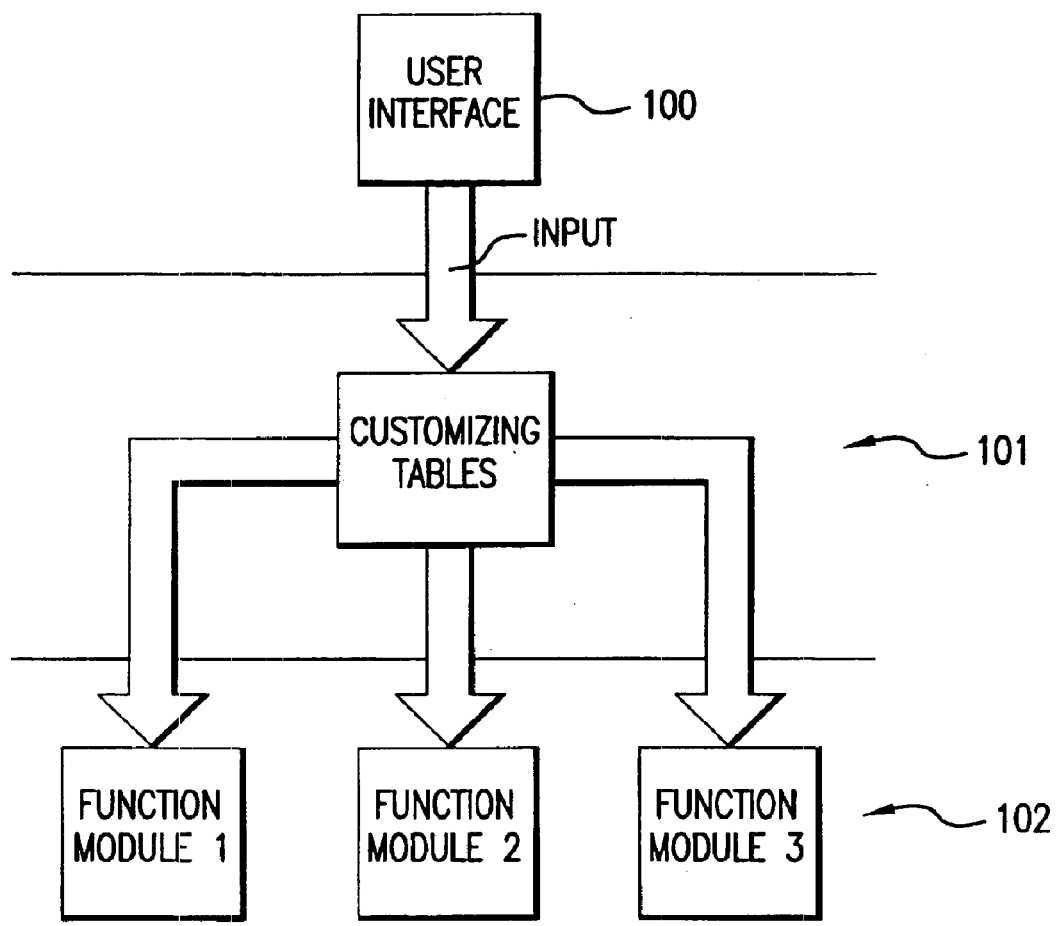
FIG. 1 shows elements of a system according to embodiments of the present invention.

FIG. 1 illustrates elements of the present invention according to embodiments. The elements may include a user interface 100: i.e., "front-end" software via which a user may invoke various operations according to embodiments of the invention. The user interface 100 may communicate with a customizing layer of software 101 that, based on inputs received via the user interface 100, may invoke functionality in a functional layer of software 102 to effect processing in support of various user-specific "business scenarios." The term "business scenarios" refers to logistical activities that may be typical of a given user's business. The functional layer 102 may, more specifically, comprise a plurality of generic function modules such as standardized "business transactions" of the well-known SAP R/3™ software.

Figure 2:
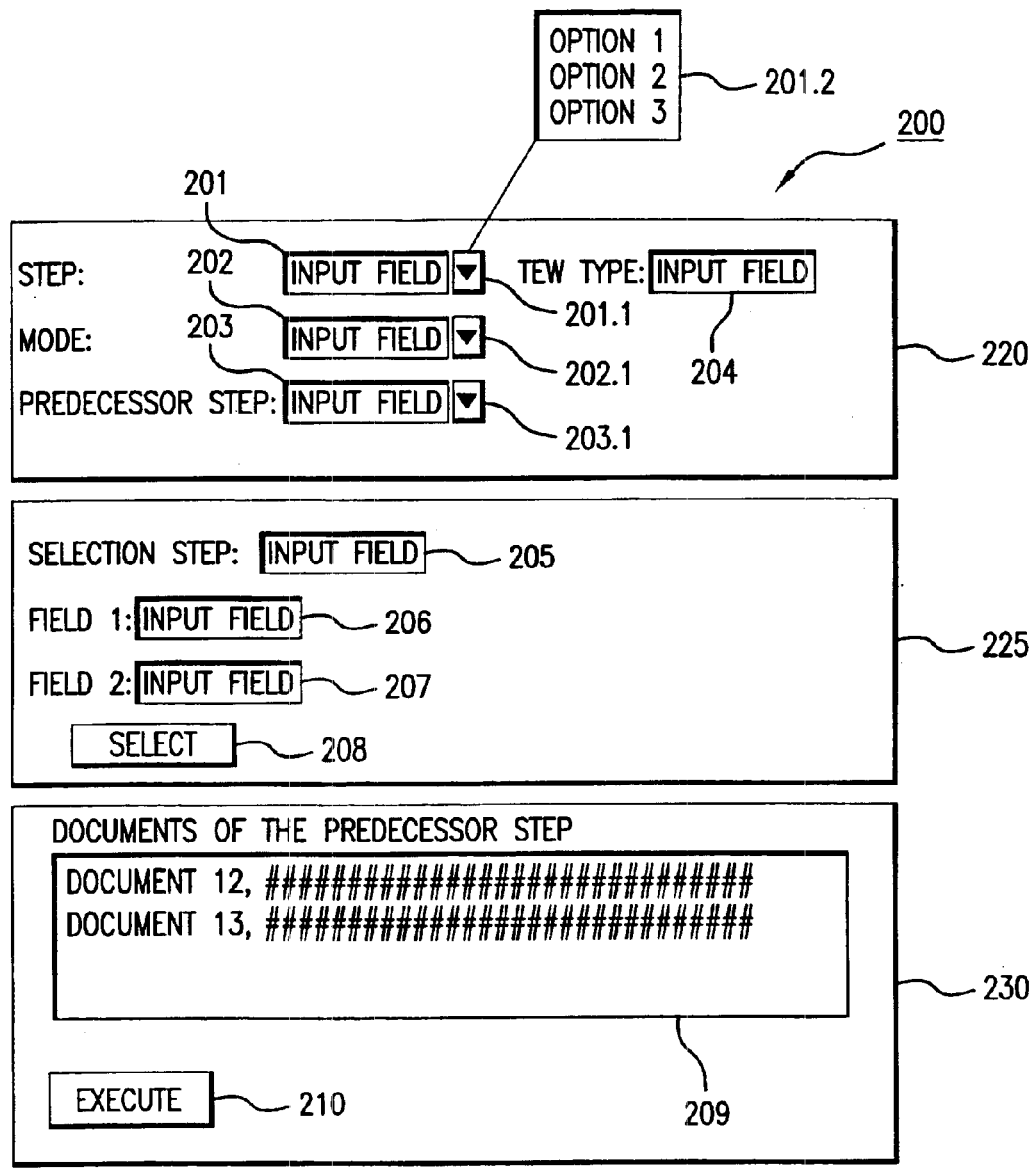
FIG. 2 shows an example of a display of a user interface according to embodiments of the present invention.

The user interface 100 may include computer-executable instructions for implementing a graphical display comprising fields for accepting user inputs, and for displaying information to a user. FIG. 2 shows one possible configuration of fields of a display 200 that could be included in the user interface 100. The display 200 could include a process region 220, a selection region 225, and a data display region 230.

The process region 220 may comprise a "step" input field 201, a "mode" input field 202, and a "predecessor step" input field 203. Each field may have an associated activator 201.1, 202.1, 203.1 of a "drop-down list box" display that lists possible allowed values for the corresponding field (e.g., drop-down list box display 201.2 showing "option 1", "option 2", and "option 3" as possible values for the step input field 201). Generally speaking, a value in the predecessor step input field 203 may represent an earlier step (relative to the "step" of field 201) of a logistical process, and source data associated with that earlier step. The data could be business documents, for example. "Document" as used herein means any kind of record, stored electronically or otherwise. A value in the mode input field 202 may represent some action to be taken using at least a portion of the source data. A value in the step input field 201 may represent a current step of a logistical process that is a desired result, or "object" or "target" of the action, and associated data, such as a newly-created or modified document.

For example, a value such as "delivery" entered in the step field 201 may represent a current operation or step of a logistical process, such as delivering purchased goods to a customer. Because a given step of a logistical process typically has distinct kinds of information associated with it, the step field may further represent a document that is to be created or otherwise acted upon as a result of performing the step, to record that distinct information. Thus, specifying "delivery" in the step field may, for example, more particularly mean, "perform some action relating to a delivery document," where the action may be specified in the mode field 202.

The predecessor step field 203 may represent source data that could be used in the creating or modifying of a document associated with the step field 201. Further, the predecessor step field 203 may represent a previous operation or step of a logistical process that has already been performed, such as receiving a customer order. Because a step in a logistical process typically has distinct kinds of information associated with it, the predecessor step may further represent an existing document or documents associated with that previous operation or step, such as a sales order identifying the customer and some quantity of goods to be sold. Thus, specifying "order" in the predecessor step field may, for example, more particularly mean, "perform some action relating to an order document," where the action may be specified in the mode field 202.

The mode field 202 may be used to specify the action to perform relative to the steps and data represented by the step field and predecessor step field. Examples of such actions include creating a new document, modifying a document, and deleting a document. The value specified for the mode field may link the values of the step and predecessor step fields in some meaningful way. Continuing with the foregoing example, the value "create" could be specified for the mode field, resulting in the step/mode/predecessor step combination "delivery/create/order", which may more particularly mean, "create a delivery document using an order document as a source."

The values acceptable in the step, mode and predecessor step fields may be designed to reflect a particular user's business. The values could be, for example, terms developed or chosen by a user himself. As noted above, each field may have a drop-down list box associated with it, where the drop-down list box lists the values acceptable by the field. The values acceptable by the fields may be terms that are descriptive of typical activities in a particular user's business, so that using the interface 100 has a natural or intuitive feel for the user. The customizing layer 101 may be designed to accept and recognize such individualized terminology, and to map the terminology to functionality in the functional layer 102 needed to carry out the actual operations to implement a corresponding process. "Functionality" as used here includes computer-executable program instructions. The functionality could include generic components usable for a range of user-specific applications. For example, the generic functionality could include common "business transactions" of the well-known SAP R/3™ software.

For example, a user might need to perform an operation, specific to his business, that he recognizes in the terms "customs clearance." All or some of the same functionality used to carry out, for example, the "delivery" component of the step/mode/predecessor step combination as described above might be usable to perform the "customs clearance" operation, but the user does not need to know this. Instead, the customizing layer could be designed to map the terms "customs clearance" to the common functionality in the functional layer. As a result, the user need only know and remember the easily understandable (to him) terms "customs clearance," and enter these terms in the user interface, while the customizing layer handles the necessary details. Similarly, the user might need to perform an operation that he recognizes in the terms "generate" and "shipping instruction," where a "shipping instruction" is a source document for a "customs clearance" document. The terms "generate" and "shipping instruction" could be respectively mapped to functionality also used for the "create" and "order" operations described above. Thus, a business-specific step/mode/predecessor step combination "customs clearance/generate/shipping instructions" could be mapped to all or some of the same functionality as the "delivery/create/order" combination above, transparently to a user. A different user might have completely different language that could also be mapped to functionality common to the "delivery/create/order" and "customs clearance/generate/shipping instructions" combinations.

The drop-down list boxes of each of the step, mode and predecessor fields may limit subsequent choices based on previous choices. For example, a particular selection of a value for the step field may mean that only a certain limited range of choices for the mode and predecessor step values are logical or possible. Thus, based on a choice of a value in the step field, a user might only be presented with a limited set of choices, as opposed to what might ordinarily be the full range of choices in the absence of any value in the step field, in the drop-down list boxes of the mode and predecessor step fields. Similarly, a choice of a value in the predecessor step field could restrict choices in the step and mode fields, or a choice of a value in the mode field could restrict choices in the step and predecessor step fields.

In view of the foregoing discussion, the step, mode and predecessor fields may act to guide a user along a predetermined set of operational paths, where the operational paths available to a user may be expressed in terms which are natural and easily understandable to the user. Moreover, operations of the customizing layer may free the user from the need for attending to the details of document handling. The customizing layer is discussed in more detail further on.

Referring again now to FIG. 2, the process region 220 may further include a "TEW type" input field 204 A value in the TEW (Trading Execution Workbench) type field may act as a high-level keyword broadly identifying or classifying business scenarios supported by processes that may be invoked via the step, mode and predecessor step fields 201, 202 and 203. The TEW type field may allow for specifying broad classes of data and functions that may each be configured differently, for example, to be used by different departments of a company. By entering a particular value for TEW type in the process region, a user could be given access to a corresponding set of functions and data for performing processes relating to a particular group of business scenarios, but not to others. In this way, disjunctive configurations of functions and data, classified by TEW type, could be created and accessed. In typical operations, the TEW type input field 204 may not be changed as frequently as, say, the step, mode and predecessor step fields 201, 202 and 203, since a number of different step/mode/predecessor step combinations may fall under the umbrella of a single TEW type.

The selection region 225 may comprise a "selection step" input field 205 and associated selection criteria input fields 206–207. These fields may be used to select specific source data for processing in accordance with a step/mode/ predecessor step combination. More specifically, the selection step input field 205 may be used to identify documents associated with the predecessor step, or with steps earlier than the predecessor step. The documents may be linked by a "document flow" system maintained for a database containing the documents. The document flow system may maintain information concerning how documents are related to each other, and be able to retrieve related documents from the database based on the information. For example, for the step/mode/predecessor step combination "goods issue/ create/delivery", the values "delivery" and "sales order" could be two possible options for the selection step field. If the "sales order" option were chosen, selection criteria might be applied to sales order documents as opposed to delivery documents, while the document flow system might enable delivery documents associated with the sales order documents to be read from the database. On the other hand, if the "delivery" option were chosen, selection criteria might be applied directly to delivery documents The associated selection criteria input fields 206 and 207 may be used to select particular ones, and/or specific portions of particular ones, of the documents corresponding to the value entered in the selection step field 205. For example, the selection criteria input fields 206 and 207 could be used to specify a range of document creation dates, the name of a document creator, or any other criteria that may be used as a basis for selection. Based on particular selection criteria entered in the selection criteria input fields, additional selection criteria input fields could be displayed, allowing for still further narrowing of a selection.

Two selection regions may be presented when a target document is involved: a selection region for source documents and a selection region for target documents. A target document is an existing document which is to be updated using data from a source document. An example of a target document is a delivery document that needs to have a field therein updated to show an increased quantity of pieces to be delivered based on a new order. An example of selection regions when a target document is involved is shown in FIG. 4C, which is discussed in more detail further on.

A "select" activation field 208 may be used to apply the selection criteria (e.g., by clicking on the "select" field with a mouse), once chosen and entered in the selection region, to read source data corresponding to the selection criteria from, for example, a user's computer database. As part of the reading of the selected data, enhancement and filtering processes provided in the customizing layer 101 may be performed on the selected data, as described in more detail further on. Entering values into the fields of the selection region 225, and initiating or activating a corresponding retrieval of data by, for example, clicking on the select activation field 208, may be referred to hereafter as "performing a selection step."

Results of performing a selection step may be displayed in an area 209 of the data display region 230. The displayed results may be in the form, for example, of a list of documents meeting the criteria specified in fields 205–207. Documents may be formatted to comprise "headers" and "items," which are data fields or structures that may be acted on as units. A document header corresponds to a single document, while a document may contain a plurality of items. A document may be a "leading" or "master" document that is displayed, but that is associated with one or more "background" documents that are not displayed. Two sets of selection results may be presented when a target document is involved: selection results for source documents and selection results for target documents. An example is shown in FIG. 4D, which is discussed in more detail further on.

The selection results may further be operated on by "marking" one or more of the results displayed in area 209. "Marking" refers to designating some portion or portions of the results for further processing according to an action corresponding to the step/mode/predecessor step combination of values entered in the process region. For example, a source document could marked to indicate an item to be inserted in a target document, and the corresponding target document could be marked for the insertion of the new item. The designating could be done, for example, by some combination of keystrokes or manipulation of a mouse.

When all selected results have been marked as desired, the marked results and the step/mode/predecessor step values entered in the process region may be passed to the customizing layer 101 for further processing, for example by clicking on an "execute" activation field 210.

The customizing layer 101 may comprise user-specific elements such as customizing tables containing user-specific data. Among other things, the customizing tables may allow a particular user to map language relating to the user's business, entered via the user interface, to various specific operations in the functional layer. The customizing tables may be adapted on-site to a particular customer's needs, for example, by a team including people knowledgeable in configuring software according to the present invention, based on information provided by the customer. A process of adapting embodiments of the invention to an individual customer's needs as described in the foregoing may be referred to hereafter as an "implementation project."

Operations of the customizing layer 101 may include operations associated with an "action class," an "enhancement class" and a "filter class." The term "class" as used herein refers to functionality; e.g., modules of computer program instructions. Accordingly, invoking or calling up functionality needed to carry out operations corresponding to values entered in the process and selection regions may be referred to herein as, for example, "calling up an action class" or "calling up an enhancement (or filter) class." The action class relates to creating, modifying or deleting documents based on a step/mode/predecessor step combination, using designated portions of results of a selection step as input. The enhancement and filter classes respectively relate to enhancing and filtering of data in the selection step. More specifically, "enhancing" may refer to adding data to a display of results from a selection step, and "filtering" may refer to suppressing data from the display of results. Enhancement and filter classes may be user-specific programs, such as programs written by or for a user during an implementation project. Though including user-specific elements, the action, enhancement and filter classes could call generic functionality, e.g., SAP R/3™ transactions as described above.

According to embodiments of the invention, an action class may be determined for a particular combination of values entered in the process region 220. In the determination of an action class, the specific combination of values entered into the step/mode/predecessor step fields may be mapped to a particular program module (the action class) that contains the program instructions needed to carry out a corresponding function or functions. "Mapped" as used here means that a specific step/mode/predecessor step value combination may be associated with a specific action class. The specific combination of step/mode/predecessor step values may correspond to a "business process step" of a business scenario, as discussed further below.

The action, enhancement and filter classes may have associated customizing tables, examples of which are shown in FIG. 3. The customizing tables may include an action class customizing table, and enhancement and filter class customizing tables. The customizing tables represent elements of an organizational framework or template according to embodiments of the invention to facilitate the adaptation of the embodiments to particular user needs. The customizing tables may be filled or populated with user-specific information during an implementation project, for example. The customizing tables 300–304 shown in FIG. 3 may be implemented as data structures stored digitally in databases on some form of machine-readable medium such as magnetic disk. Values stored in the tables may, for example, be read by program instructions of the customizing layer, and used as a basis for decisions and other operations of the customizing layer.

The action class customizing table 300 may comprise a TEW_TYPE field corresponding to the TEW type field 204 discussed earlier. The action class customizing table may further comprise a STEP field corresponding to the step input field 201, a TEW_MODE field corresponding to the mode input field 202, and a PRE_STEP field corresponding to the predecessor step input field 203. The action class customizing table may further comprise a SCENARIO field corresponding to a particular business scenario, and a CL_ACTION field identifying functionality (the action class) for carrying out a function or functions corresponding to the step/mode/predecessor step combination in the STEP/TEW_MODE/PRE_STEP.

According to embodiments, the table 300 could be an SQL (structured query language) -based table. "Key field" and "attribute" as shown in table 300 and other tables of FIG. 3 are SQL-based notations. An SQL database table may contain a plurality of table lines, each with a unique key. An attribute may be associated with a key or group of keys. Thus, for example, a group of key fields as shown in table 300 may be used to associate a combination of values with a single attribute. More specifically, key fields TEW_TYPE, SCENARIO, STEP, TEW_MODE and PRE_STEP may be used to map a combination of values defined therefor to a unique action class defined as the value corresponding to the CL_ACTION attribute field.

The action class customizing table 300 may be used in the determination of an action class based on a TEW type/scenario/step/mode/predecessor step combination entered in the process region. More specifically, although table 300 shows only a single group of fields, the group of fields shown in table 300 may be replicated a plurality of times in the table. Each group may be assigned a different combination of TEW_TYPE/SCENARIO/STEP/TEW_MODE/PRE_STEP values, having a corresponding CL_ACTION field associated therewith. When a user enters some combination of TEW type/step/mode/predecessor step values via the user interface, software of the customizing layer may cause the entered combination to be compared with the groups of TEW_TYPE/STEP/TEW_MODE/PRE_STEP value combinations resident in the action class customizing table. When a TEW type/step/mode/predecessor step value combination entered via the user interface matches a TEW_TYPE/STEP/TEW_MODE/PRE_STEP value combination of a particular group, the action class identified in the CL_ACTION field associated with the matching group may be called up to carry out an action corresponding to the step/mode/predecessor step combination. The data resulting from a selection step may be passed to the action class functionality for processing.

The value of the SCENARIO field may also be factored into a determination of what action class to call up, and may be defined in various ways depending on how a user's business is organized or how the user wants to organize his business. For example, logistical activities that are typical of a given user's business may be categorized according to (i.e., identified as belonging to or associated with) a corresponding business scenario; "business process steps" of the scenario may be steps that are typically carried out in support of the logistical activities. Accordingly, a SCENARIO value may identify a particular business scenario; a STEP/MODE/PRE_STEP combination may identify an associated business process step. The associations of business process steps with business scenarios are flexible and adaptable to user preferences and needs. For example, two business scenarios could be respectively characterized as an "import" scenario and an "export" scenario. Each of the import and export scenarios could contain a business process step called "delivery," even though the detailed operations associated with the "delivery" step could be very different for the import and export scenarios.

As noted earlier, results retrieved by a selection step could be processed with enhancement classes and filter classes according to embodiments of the present invention, before being passed to an action class. Enhancement classes may act to add user-defined data to a display of results from a selection step. For example, a user may decide that he wants particular information from related documents to appear in a display of documents retrieved as a result of a selection step, and design an enhancement class accordingly. There could be, for instance, an enhancement class that caused information from sales documents to be read from a database and added to a display of delivery documents retrieved in the selection step, an enhancement class that caused information from delivery documents to be read from a database and added to a display of contract documents retrieved in the selection step, and so on. Documents as originally stored in and read from a database are not changed by the enhancement classes; only the display of results in the data display region 230 is enhanced. Data may also be generated dynamically by enhancement classes, as opposed to being read from a database. For example, an enhancement class could be created that calculates how many pieces of an order remain to be delivered, based on a previous sale and delivery, and displays the number of pieces remaining to be delivered in a display of results of the selection step.

Customizing tables such as enhancement class customizing tables 301 and 302 may be used to assign enhancement classes. "Assigning" an enhancement class means designating particular functionality to be called up to carry out the operations needed to include enhancing data in selection step results displayed in data display region 230, for a particular set of values entered into the process region 220 and criteria entered in the selection region 225 of the user interface display 200. According to embodiments of the invention, enhancement classes could be assigned, for example, at a TEW type/step level and/or at a TEW type/scenario/step/mode/predecessor step combination level. Enhancement class customizing table 301 is an example of a customizing table that assigns an enhancement class at a TEW type/step level. "Step level" as used here means either for source data corresponding to a predecessor step (field 203), or for target data corresponding to a current step (field 201).

In table 301, the STEP field may correspond to either the step field 201 (for target data) or the predecessor step field 203 (for source data) of the process region. An EXECUTION_TIME field associated with the STEP field may specify whether the STEP field corresponds to source data to be enhanced, or to target data to be enhanced. The CL_ENHANCE field identifies the functionality (the enhancement class) to be called, and the ENH_ORDER field specifies when it is to be called. That is, because more than one enhancement class may be called for the same STEP field value, the ENH_ORDER field of table 301 may be used to specify a place for an associated enhancement class in an order or sequence of other enhancement classes which could also be called. The TEW_TYPE field corresponds to TEW type field 204 of the process region.

Although table 301 shows only a single group of fields, the group of fields shown may be replicated a plurality of times in the table, with each group of fields assigned a different combination of TEW_TYPE, STEP, EXECUTION_TIME, ENH_ORDER and CL_ENHANCE values that are associated with each other. When a user performs a selection step and activates a "select" operation as described above, the values entered in the process region and selection region may be passed to the customizing layer. Software of the customizing layer may cause the values entered in the process region to be compared with values in fields of the plurality of the enhancement class customizing table 301. Assuming the TEW type value 204 matches the TEW_TYPE field, when the value of the predecessor step field 203 matches a STEP value of table 301 and the associated EXECUTION_TIME field indicates that the STEP field corresponds to source data, the enhancement class identified in the associated CL_ENHANCE field may be called, according to its place in an order of a plurality of enhancement classes that may also be called for the same STEP value. The ENH_ORDER specifies the enhancement class's place in the order (e.g., first, second, etc.). The enhancement class or classes called up may perform the operations needed to insert the corresponding enhancing information in non-permanent display data associated with source data retrieved based on the values in the selection region.

Similarly, when the value of the step field 201 matches a STEP value of table 301 and the associated EXECUTION_TIME field indicates that the STEP field corresponds to target data, the enhancement class identified in the associated CL_ENHANCE field may be called, according to its place in an order of a plurality of enhancement classes that may also be called for the same STEP value. The enhancement class or classes called up may perform the operations needed to insert the corresponding enhancing information in non-permanent display data associated with target data retrieved based on the values in the selection region.

For example, a user might enter "delivery/add item/sales order" as a step/mode/predecessor step combination, meaning, "add an item to a delivery document using a sales order document as a source." Assume that the user has created an enhancement class that calculates how many pieces of an order remain to be delivered, based on a previous sale and delivery. For example, if a sales order sold 100 pieces and only 40 pieces had been delivered, 60 pieces would remain to be delivered. The step/mode/predecessor step combination "delivery/add item/sales order" could cause an enhancement class customizing table such as table 301 to be searched for all occurrences where the STEP field has the value "sales order" and the associated EXECUTION_TIME field indicates that the STEP field corresponds to source data. For all such occurrences, the corresponding enhancement classes, as identified in the associated CL_ENHANCE fields, might be called, in their respective places in an order of enhancement classes called as specified in respective ENH_ORDER fields. The called enhancement classes might cause a field indicating a number of pieces remaining to be delivered (e.g., 60 pieces) to be inserted in data from sales documents read and displayed as a result of selection criteria entered in a selection step.

Because the above example also involves a target document (an item is being added to a delivery document), an enhancement class customizing table such as table 301 could be searched for all occurrences where the STEP field has the value "delivery" and the associated EXECUTION_TIME field indicates that the STEP field corresponds to target data. For all such occurrences, the corresponding enhancement classes, as identified in the associated CL_ENHANCE fields, might be called, in their respective places in an order of enhancement classes called as specified in respective ENH_ORDER fields. The called enhancement classes might, for example, cause a field indicating a additional material information to be inserted in data from delivery documents read and displayed as a result of selection criteria entered in a selection step.

Enhancement class customizing table 302 is an example of a customizing table that assigns an enhancement class on a TEW type/scenario/step/mode/predecessor step level. In table 302, the TEW_TYPE/STEP/MODE/PRE_STEP fields correspond to the TEW type/step/mode/predecessor step fields 201–204 of the process region. The CL_ENHANCE field identifies the enhancement class for inserting enhancing information in a document, based on the TEW type/step/mode/predecessor step field values. Along the lines discussed above in connection with customizing table 301, when a user performs a selection step and activates a "select" operation, software of the customizing layer may cause the values entered in the fields 201–204 to be compared with values in TEW_TYPE/STEP/MODE/PRE_STEP/ fields of the enhancement class customizing table 302. A value for the SCENARIO field may also be factored into the comparison. When the values match, the enhancement class identified in a corresponding CL_ENHANCE field of the table 302 may be called up to perform the operations needed to insert the corresponding enhancing information. The EXECUTION_TIME and ENH_ORDER fields may operate as described above in connection with table 301. It may be appreciated that table 302 is more selective than table 301 in terms of calling up enhancement classes, since according to embodiments, it may be required that a match occur for all of the TEW_TYPE/SCENARIO/STEP/MODE/PRE_STEP fields.

Filter classes may be used to suppress the display of data in documents that are retrieved and displayed in the selection results display area 209. Recalling that documents may be formatted to comprise headers and items, display of an entire document may be suppressed by nulling the document header; suppressing of the display of selected areas within a document may be done by nulling corresponding items within the document. Filter classes may be invoked along similar lines to those discussed earlier in connection with enhancement classes. Customizing tables such as filter class customizing tables 303 and 304 may be used to assign filter classes. As with enhancement classes, filter classes could be assigned, for example, at a step level and/or at a TEW type/scenario/step/mode/predecessor step combination level. Filter class customizing table 303 is an example of a customizing table that assigns a filter class at a step level. In table 303, the STEP field corresponds to the step field 201 (for target documents) and to the predecessor step field 203 (for source documents) of the process region. The CL_FILTER field identifies the filter class for performing a filtering operation on a document, based on the associated TEW_TYPE, STEP, EXECUTION_TIME, and ENH_ORDER values. Filter class customizing table 304 is an example of a customizing table that assigns a filter class at a TEW type/scenario/step/mode/predecessor step level, using operations analogous to those described above in connection with enhancement class customizing table 302.

Figure 4A:
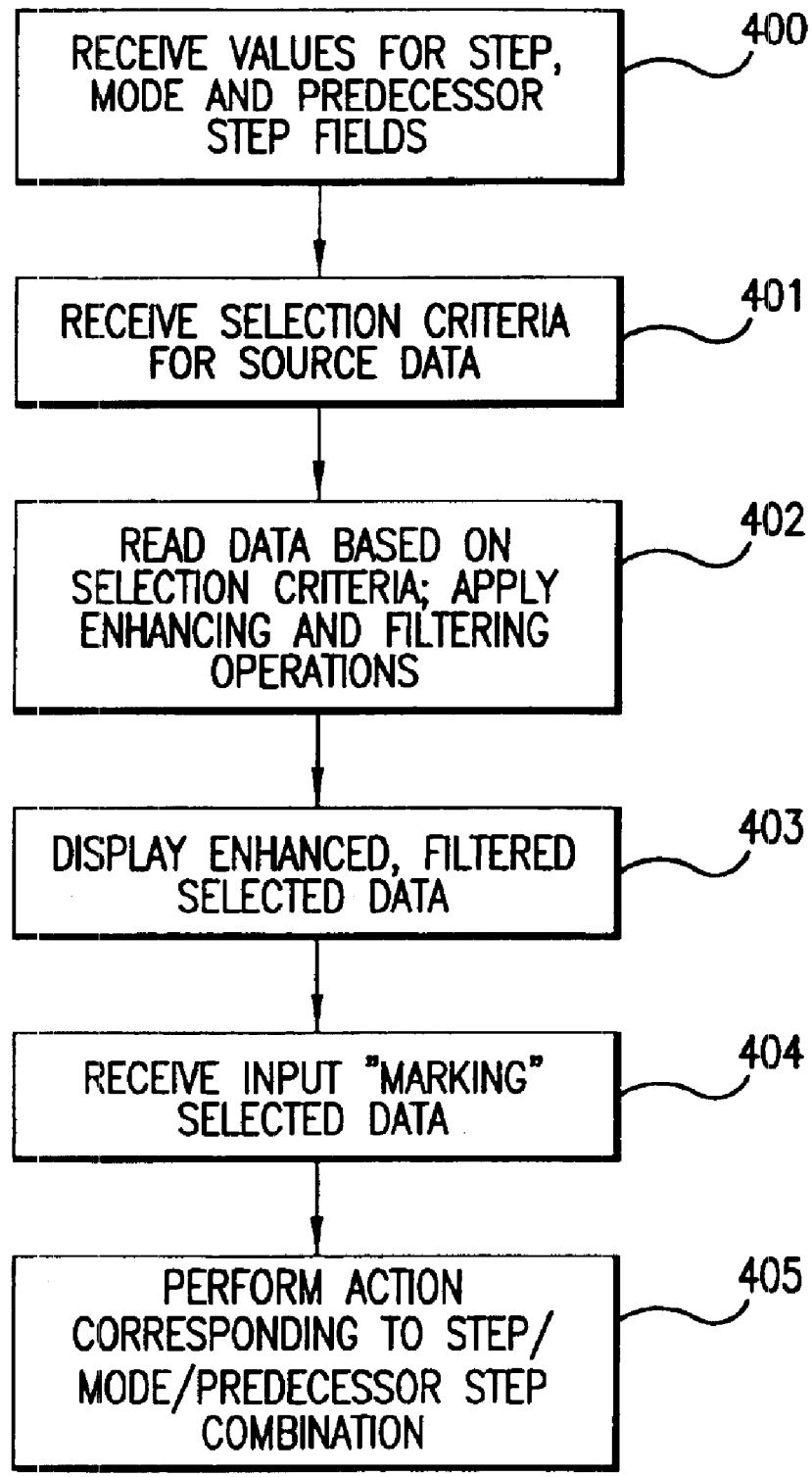
FIGS. 4A and 4B show process flows according to embodiments of the present invention.
Figure 4B:
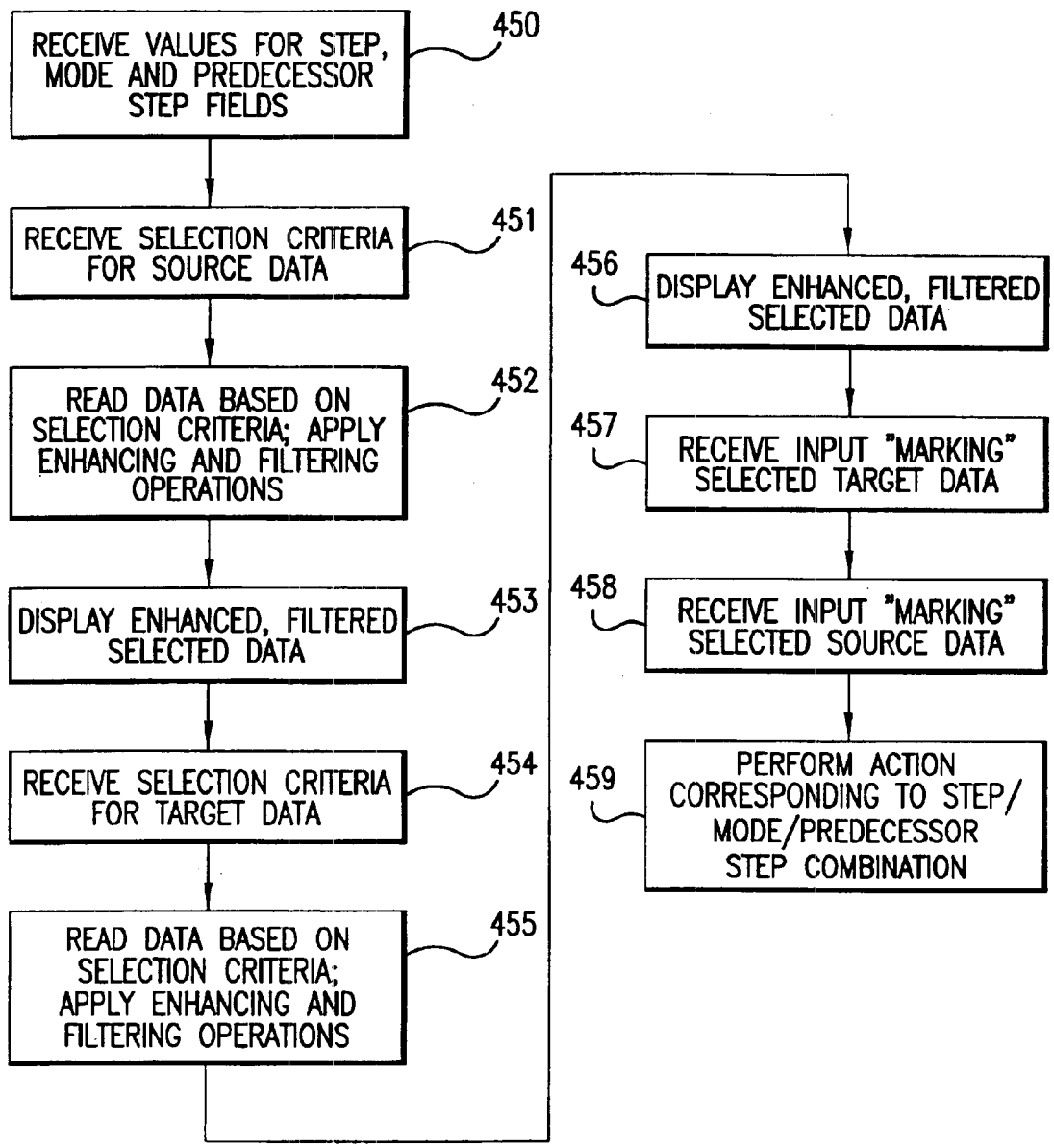
Figure 4C:
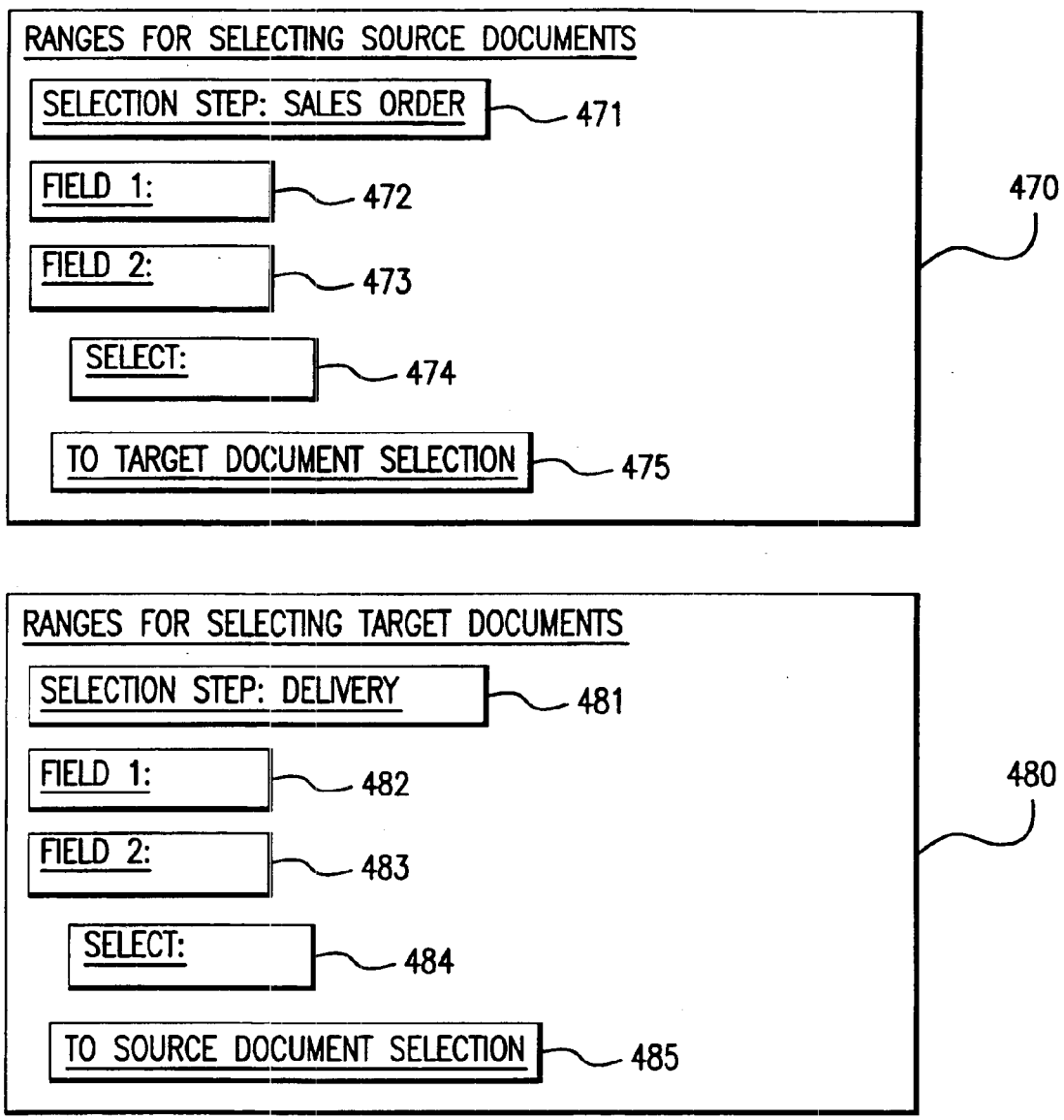
FIG. 4C shows data selection regions according to embodiments of the present invention.
Figure 4D:
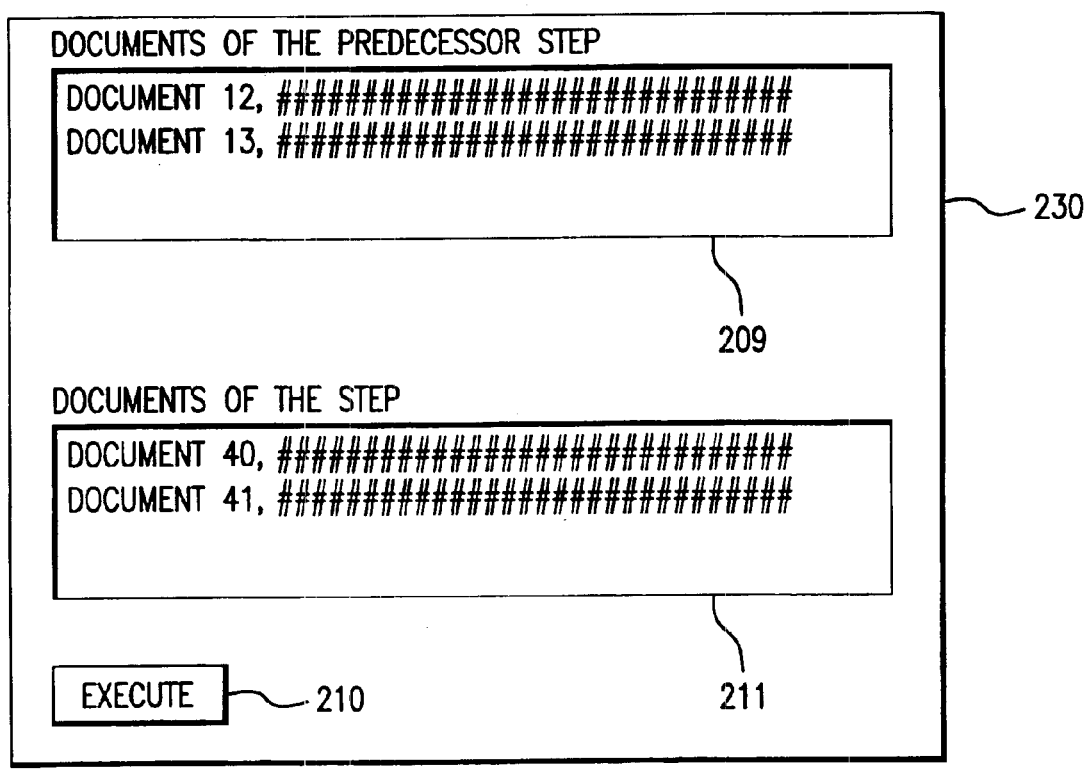
FIG. 4D shows data display regions according to embodiments of the present invention.

FIGS. 4A and 4B show process flows according to embodiments of the invention. The process flows illustrated represent two basic sequences of operations that may be performed. In the flow of FIG. 4A, operations involving a source document, but no target document, are illustrated. In the flow of FIG. 4B, operations involving both a source document and a target document are illustrated.

The process flow of FIG. 4A will be discussed in connection with an example of creating a new document based on a source document. The process may include receiving user-defined values for step, mode and predecessor step via a user interface as shown in block 400. For example, a user may enter the step/mode/predecessor step combination "delivery/create/sales order", meaning "create a new delivery document based on a sales order document." The process may further include receiving selection criteria for selecting source data, corresponding to the predecessor step, for processing according to an action corresponding to the step, mode and predecessor step combination as shown in block 401. For example, the user could enter "sales order" in the selection step field 205 of the user interface, and specify some range of dates as the selection criteria in fields 206 and 207.

As shown in block 402, the process may further include reading data, based on the selection criteria, from a database, and applying enhancing and filtering operations to the selected data. In the example under discussion, this may mean reading all sales orders recorded within the specified range of dates from the database. The data, after having been enhanced and filtered, may be displayed in a display area of a user interface as shown in block 403. For example, headers and items of the selected sales orders could be displayed.

The process may further include receiving user input designating a portion or portions (e.g., via "marking" as described above) of the enhanced and filtered selected data for further processing according to the action corresponding to the step, mode and predecessor step combination, as shown in block 404. After the portions are designated, the action may performed, as shown in block 405. In the example under discussion, a new document based on a source document is being created. Accordingly, this could mean that the user marks an item of a sales document and activates the "execute" field 210, resulting in a new delivery document for the marked item being created and stored on a database.

In the flow of FIG. 4B, operations involving both a source document and a target document are illustrated, in connection with an example of designating an item in a source document based on which an item in a target document will be added or modified. The process may include receiving user-defined values for step, mode and predecessor step via a user interface as shown in block 450. For example, a user may enter the step/mode/predecessor step combination "delivery/add item/sales order", meaning "add an item to an existing delivery document based on an item in a sales order document." Because the process of FIG. 4B involves a target document, two selection steps may need to be performed: a selection step for the source data, and a selection step for the target data. Accordingly, two selection regions 470 and 480 as shown in FIG. 4C may be presented according to embodiments of the invention. Each selection region 470, 480 may have fields 471–474, 481–484, respectively, analogous to fields 205–208 of selection region 225 discussed above. Moreover, selection region 470 may have a "toggle" button 475 to allow a user to switch to selection region 480 and enter values therein, while selection region 480 may have a counterpart button 485 to allow a user to switch to selection region 470 and enter values therein.

In view of the above, the process may further include receiving selection criteria for selecting source data, corresponding to the predecessor step, for processing according to an action corresponding to the step, mode and predecessor step combination as shown in block 451. For example, the user could enter "sales order" in the selection step field 471 of the selection region 470, and specify some range of dates as the selection criteria in fields 472 and 473.

As shown in block 452, data corresponding to the selection criteria for the source data may be read in from a database, and enhancing and filtering operations may be applied to the selected data. In the present example, this may mean reading all sales orders recorded within the specified range of dates from the database. The data, after having been enhanced and filtered, may be displayed in a display area of a user interface as shown in block 453. For example, headers and items of the selected sales orders could be displayed.

The process may further include receiving selection criteria for selecting target data, corresponding to the step, for processing according to an action corresponding to the step, mode and predecessor step combination as shown in block 454. For example, the user could enter "delivery" in the selection step field 481 of the selection region 480, and specify some range of dates as the selection criteria in fields 482 and 483. As shown in block 455, data corresponding to the selection criteria for the target data may be read in from a database, and enhancing and filtering operations may be applied to the selected data. In the present example, this may mean reading all delivery documents recorded within the specified range of dates from the database. The data, after having been enhanced and filtered, may be displayed in a display area of a user interface as shown in block 456. For example, headers and items of the selected delivery documents could be displayed.

FIG. 4D shows an example of a data display region 230 of enhanced, filtered selection results for both source and target documents. As shown, in addition to selection results for source documents 209, the data display region may include selection result for target documents 211.

The process may further include receiving user input designating a portion or portions of the enhanced and filtered selected target data and source data for further processing according to an action corresponding to the step, mode and predecessor step combination, as shown in block 457–458. After the portions are designated, the action may performed, as shown in block 459. In the example under discussion, an item from a sales order document is being added to an existing delivery document. Accordingly, this could mean that the user marks an item of a sales document, marks a delivery document to which the item is to be added, and activates the "execute" field 210, resulting in the item marked in the sales document being added to the delivery document.

Figure 5:
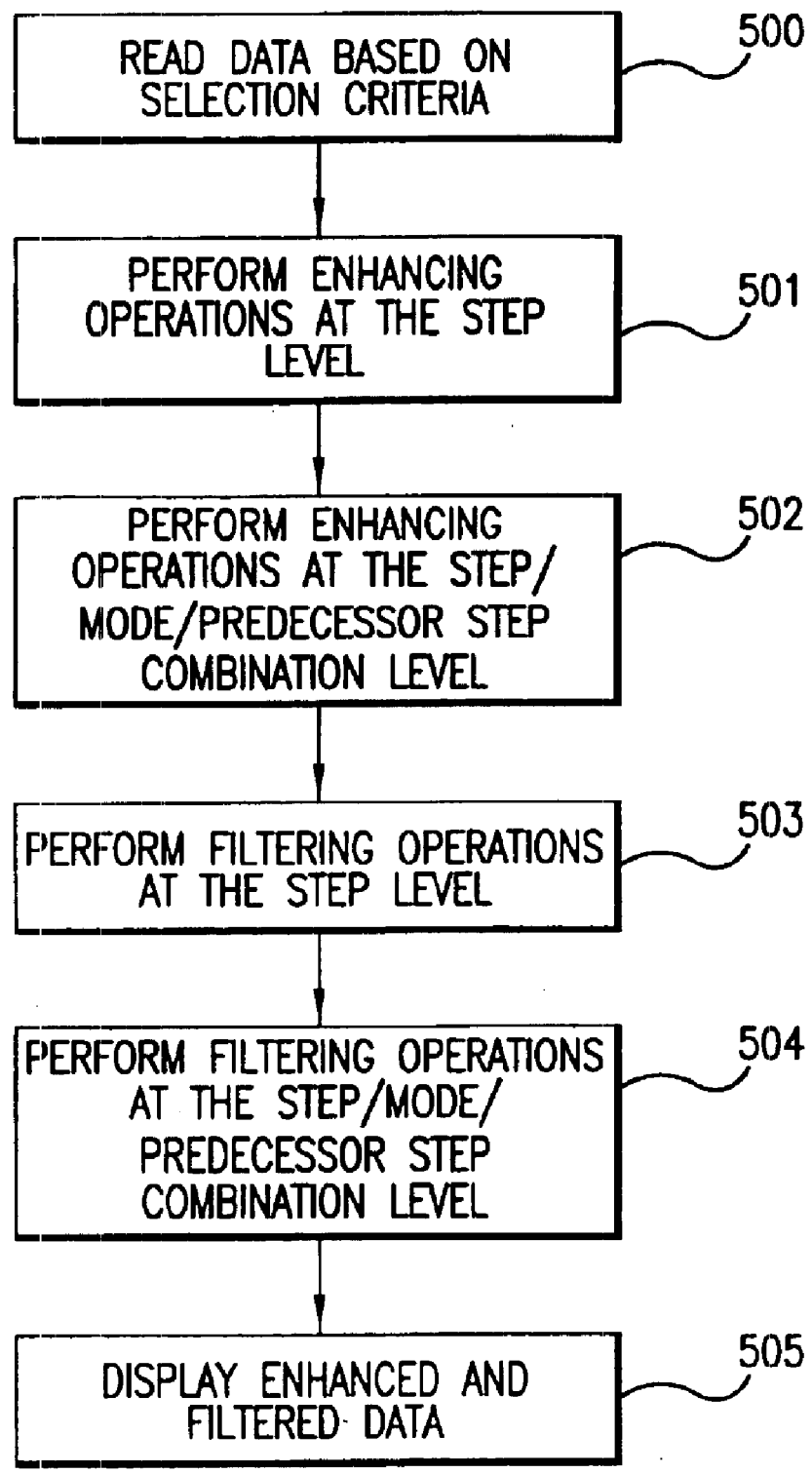
FIG. 5 shows a process flow according to embodiments of the present invention.

FIG. 5 shows a process flow illustrating in more detail operations associated with blocks 402, 403, 452, 453, 455 and 456 above. As shown in block 500, data corresponding to user-defined selection criteria may be read from a database. As shown in block 501, enhancing operations may be performed at the step level. Enhancing data may be further be performed at the step/mode/predecessor step combination level, as shown in block 502.

Filtering operations may be performed at the step level, as shown in block 503; and at the step/mode/predecessor step combination level, as shown in block 504. As shown in block 505, the enhanced and filtered data may then be displayed in display area of a user interface.

Figure 6:
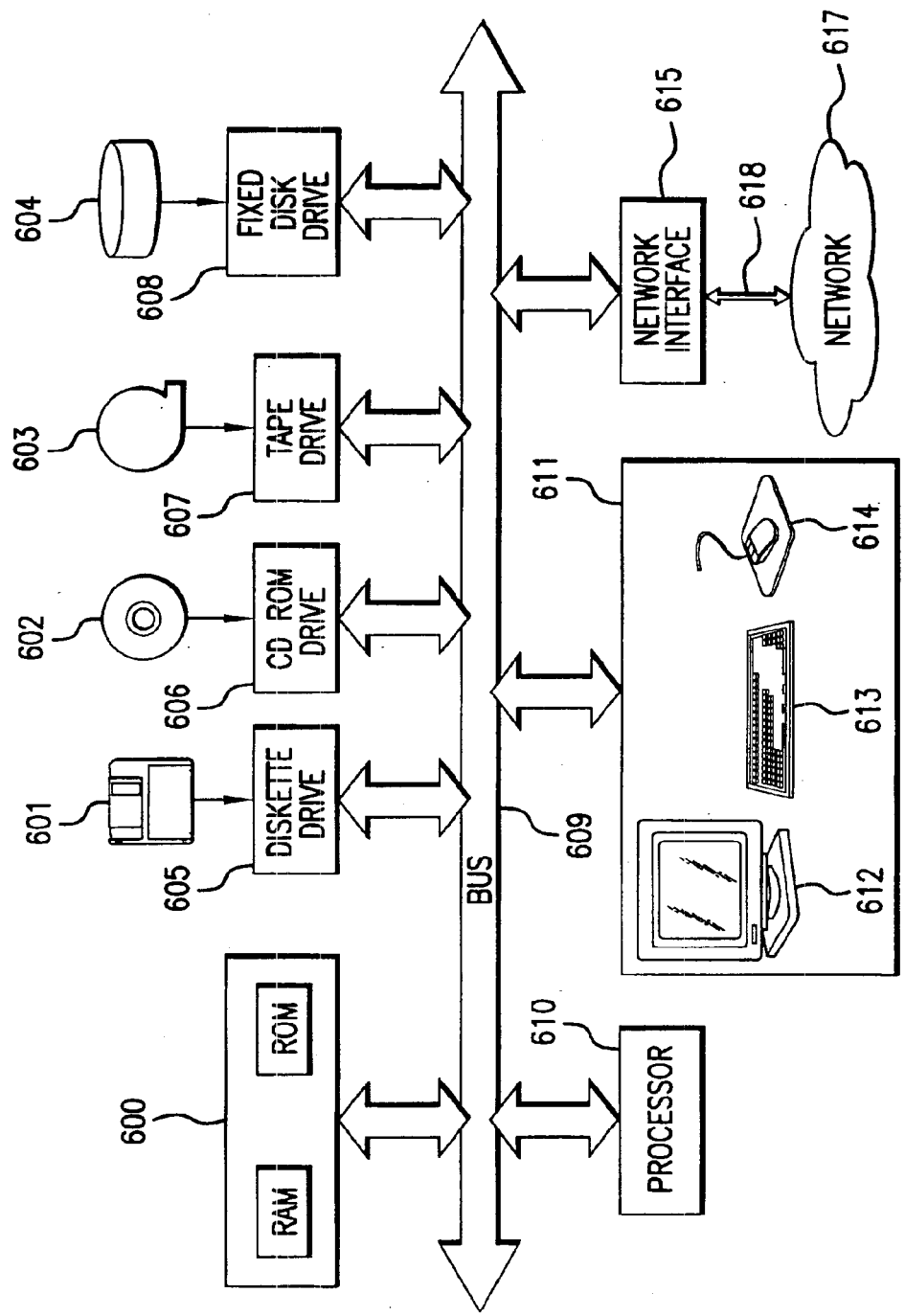
FIG. 6 shows a computer system for implementing embodiments of the present invention.

FIG. 6 shows a high-level representation of a computer system for implementing embodiments of the present invention, such as might be realized by a variety of known and commercially available hardware and software elements. The system may comprise a memory 600 including ROM and RAM, processor 610 and user interface 611 comprising a display device 612, keyboard 613 and mouse 614. Elements may communicate via a system bus 606. The system may further comprise a network 617 connected by a network medium 618 and network interface 615.

A computer program or collection of programs comprising computer-executable instructions according to embodiments of the present invention may be stored and transported on computer-usable media such as diskette 601, CD-ROM 602, magnetic tape 603 and fixed disk 604. The computer instructions may be retrieved from the computer-usable media 601–604 using their respective drives 605–608 into memory 600, and executed by a processor 610. The functionality disclosed hereinabove for performing the embodiments may find specific implementations in a variety of forms, which are considered to be within the abilities of a programmer of ordinary skill in the art after having reviewed the specification.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A system comprising:
   a computer processor; and
   a storage medium to store computer-executable instructions executable by the computer processor to implement:
      a user interface to receive a set of value combinations corresponding to operations in a logistics process;
      a customizing layer to map the value combinations to functionality for performing the operations; and
      functionality responsive to the customizing layer to perform the operations;
   wherein the user interface comprises:
      a step field to receive a value relating to a current step in a logistics process and data associated therewith;
      a predecessor step field to receive a value relating to a step in a logistics process previous to the current step, and data associated therewith; and
      a mode field to receive a value relating to an action to be performed based on values received in the step and predecessor step fields.

2. The system of claim 1, wherein the user interface further comprises a selection region to receive selection criteria for source data associated with a value received in the predecessor step field.

3. The system of claim 2, wherein the user interface further comprises a data display region to display data resulting from an application of the selection criteria.

4. The system of claim 3, wherein the customizing layer comprises an enhancement class customizing table containing fields corresponding to at least one of the step, mode and predecessor step fields of the user interface, to map values received in at least one of the step, mode and predecessor step fields to an enhancement class comprising functionality relating to adding user-defined data to the display of data resulting from the application of the selection criteria.

5. The system of claim 3, wherein the customizing layer comprises a filter class customizing table containing fields corresponding to at least one of the step, mode and predecessor step fields of the user interface, to map values received in at least one of the step, mode and predecessor step fields to a filter class comprising functionality relating to suppressing data from the display of data resulting from the application of the selection criteria.

6. The system of claim 3, wherein the data display region is configured to receive user input to designate a portion of the data resulting from the application of the selection criteria for processing in accordance with an action corresponding to a combination of values received in the step, mode and predecessor step fields.

7. The system of claim 1, wherein the action includes one of creating, modifying and deleting a document.

8. The system of claim 1, wherein the customizing layer comprises an action class customizing table containing fields corresponding to the step, mode and predecessor step fields of the user interface, to map values received in the step, mode and predecessor step fields to an action class comprising functionality relating to one of creating, modifying and deleting a document in accordance with a combination of values received in the step, mode and predecessor step fields.

9. The system of claim 1, wherein each of the step, mode and predecessor step fields has a drop-down list box associated therewith, a respective drop-down list box listing values acceptable in a corresponding field.

10. The system of claim 9, wherein the acceptable values are expressible in user-defined language.

11. A method comprising:
(i) receiving a value in each of a step, mode and predecessor step field of a user interface, wherein:
a value received in the step field relates to a current step in a logistics process and data associated therewith;
a value received in the predecessor step field relates to a step in a logistics process previous to the current step, and data associated therewith; and
a value received in the mode field relates to an action to be performed based on values received in the step and predecessor step fields; and
(ii) receiving selection criteria for selecting data corresponding to the predecessor step for processing in accordance with an action corresponding to a combination of values received in the step, mode and predecessor step fields.

12. The method of claim 11, further comprising:
(iii) reading data from a database based on the selection criteria;
(iv) applying enhancing operations to the data read, the enhancing operations relating to adding user-defined data to a display of data resulting from an application of the selection criteria.

13. The method of claim 12, further comprising:
(v) applying filtering operations to the data read, the filtering operations relating to suppressing data from the display of data resulting from the application of the selection criteria.

14. The method of claim 13, further comprising:
(vi) receiving input designating a portion of the enhanced and filtered data for processing in accordance with the action.

15. The method of claim 14, wherein the data is a source document.

16. The method of claim 14, wherein the data is a target document.

17. A machine-readable medium storing computer-executable instructions to implement:
a user interface to receive a set of value combinations corresponding to operations in a logistics process;
a customizing layer to map the value combinations to functionality for performing the operations; and
functionality responsive to the customizing layer to perform the operations;
wherein the user interface comprises:
a step field to receive a value relating to a current step in a logistics process and data associated therewith;
a predecessor step field to receive a value relating to a step in a logistics process previous to the current step, and data associated therewith; and
a mode field to receive a value relating to an action to be performed based on values received in the step and predecessor step fields.

18. The machine-readable medium of claim 17, wherein the user interface further comprises a selection region to receive selection criteria for source data associated with a value received in the predecessor step field.

19. The machine-readable medium of claim 18, wherein the user interface further comprises a data display region to display data resulting from an application of the selection criteria.

20. The machine-readable medium of claim 19, wherein the customizing layer comprises an action class customizing table containing fields corresponding to the step, mode and predecessor step fields of the user interface, to map values received in the step, mode and predecessor step fields to an action class comprising functionality relating to one of creating, modifying and deleting a document in accordance with a combination of values received in the step, mode and predecessor step fields.

21. The machine-readable medium of claim 19, wherein the customizing layer comprises an enhancement class customizing table containing fields corresponding to at least one of the step, mode and predecessor step fields of the user interface, to map values received in at least one of the step, mode and predecessor step fields to an enhancement class comprising functionality relating to adding user-defined data to the display of data resulting from the application of the selection criteria.

22. The machine-readable medium of claim 19, wherein the customizing layer comprises a filter class customizing table containing fields corresponding to at least one of the step, mode and predecessor step fields of the user interface, to map values received in at least one of the step, mode and predecessor step fields to a filter class comprising functionality relating to suppressing data from the display of data resulting from the application of the selection criteria.

23. The machine-readable medium of claim 19, wherein the data display region is configured to receive user input to designate a portion of the data resulting from the application of the selection criteria for processing in accordance with an action corresponding to a combination of values received in the step, mode and predecessor step fields.

24. The machine-readable medium of claim 17, wherein the action includes one of creating, modifying and deleting a document.

25. The machine-readable medium of claim 17, wherein each of the step, mode and predecessor step fields has a drop-down list box associated therewith, a respective drop-down list box listing values acceptable in a corresponding field.

26. The machine-readable medium of claim 25, wherein the acceptable values are expressible in user-defined language.

* * * * *